(12) United States Patent
Klingenbrunn et al.

(10) Patent No.: US 9,026,112 B2
(45) Date of Patent: May 5, 2015

(54) TRANSITIONING OF MOBILE DEVICES WITHIN A WIRELESS COMMUNICATION NETWORK BETWEEN MULTIPLE RADIO ACCESS TECHNOLOGIES

(75) Inventors: Thomas Klingenbrunn, San Diego, CA (US); Shyamal Ramachandran, San Diego, CA (US); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 13/480,257

(22) Filed: May 24, 2012

(65) Prior Publication Data

US 2012/0302241 A1    Nov. 29, 2012

Related U.S. Application Data

(60) Provisional application No. 61/490,026, filed on May 25, 2011.

(51) Int. Cl.
*H04W 4/00* (2009.01)
*H04W 48/16* (2009.01)
*H04W 48/18* (2009.01)
(Continued)

(52) U.S. Cl.
CPC .............. *H04W 48/16* (2013.01); *H04W 48/18* (2013.01); *H04W 76/048* (2013.01); *H04W 88/16* (2013.01)

(58) Field of Classification Search
USPC .......................... 455/422.1, 432.1, 436–444, 455/435.1–435.3; 370/328, 331–333
See application file for complete search history.

(56) References Cited

U.S. PATENT DOCUMENTS 6,108,542 A    8/2000  Swanchara et al.
2008/0045262 A1*  2/2008  Phan et al. ..................... 455/525
(Continued)

FOREIGN PATENT DOCUMENTS

EP    2249607 A1    11/2010

OTHER PUBLICATIONS

3rd Generation Partnership Project; Technical Specification Group Core Network and Terminals; Non-Access-Stratum (NAS) functions related to Mobile Station (MS) in idle mode (Release 10), 3GPP Standard; 3GPP TS 23.122, 3rd Generation Partnership Project (3GPP), Mobile Competence Centre; 650, Route Des Lucioles; F-06921 Sophia-Antipolis Cedex; France, No. V10.3.0, Mar. 1, 2011, pp. 1-43, XP050476762, [retrieved on Apr. 1, 2011].
(Continued)

*Primary Examiner* — Ajit Patel
(74) *Attorney, Agent, or Firm* — Norton Rose Fulbright US LLP (57) ABSTRACT

Network re-selection by an idle mobile device between multiple radio access technologies (RATs) is provided for communication networks without a network-based solution. When a user equipment (UE) enters idle mode while camped to a first RAT network, it initiates an out of service search procedure that causes the UE to search for other RATs within a same public land mobile network (PLMN). If another RAT network is detected, the UE determines whether the priority of the detected RAT is higher than the priority of the first RAT. When the detected RAT has a higher priority than the first RAT, the UE re-selects and camps to that detected RAT network. If the detected RAT does not have a higher priority or no other RAT is detected within the PLMN, the UE re-camps to the first RAT network.

20 Claims, 5 Drawing Sheets

(51) Int. Cl.
H04W 76/04 (2009.01)
H04W 88/16 (2009.01)

(56) References Cited

U.S. PATENT DOCUMENTS

| | | | |
|---|---|---|---|
| 2008/0176565 A1* | 7/2008 | Eerolainen et al. | 455/436 |
| 2009/0274121 A1* | 11/2009 | Bertorelle et al. | 370/331 |
| 2009/0286542 A1* | 11/2009 | Roberts et al. | 455/436 |
| 2010/0035575 A1* | 2/2010 | Wu | 455/404.1 |
| 2010/0046428 A1* | 2/2010 | Lee et al. | 370/328 |
| 2011/0149907 A1 | 6/2011 | Olsson et al. | |
| 2011/0171925 A1 | 7/2011 | Faccin et al. | |
| 2012/0015646 A1* | 1/2012 | Burbidge et al. | 455/422.1 |
| 2013/0189988 A1* | 7/2013 | Alonso-Rubio et al. | 455/436 |

OTHER PUBLICATIONS

3rd Generation Partnership Project; Technical Specification Group GSM/EDGE Radio Access Network; Radio subsystem link control (Release 10), 3GPP Standard; 3GPP TS 45.008, 3rd Generation Partnership Project (3GPP), Mobile Competence Centre; 650, Route Des Lucioles; F-06921 Sophia-Antipolis Cedex; France, No. V10.0.0, Mar. 1, 2011, pp. 1-148, XP050476679, [retrieved on Apr. 1, 2011].
3rd Generation Partnership Project; Technical Specification Group Radio Access Network; User Equipment (UE) procedures in idle mode and procedures for cell reselection in connected mode (Release 10), 3GPP Standard; 3GPP TS 25.304, 3rd Generation Partnership Project (3GPP), Mobile Competence Centre; 650, Route Des Lucioles; F-06921 Sophia-Antipolis Cedex; France, No. V10.0.0, Mar. 28, 2011, pp. 1-51, XP050476462, [retrieved on Mar. 28, 2011].
Ericsson, "Proposed CR036 to 25.304on RAT selection at cell selection," R2-001340, 3GPP RAN WG2#14, Paris, France, Jul. 3-7, 2000, pp. 1-11.
International Search Report and Written Opinion—PCT/US2012/039632—ISA/EPO—Aug. 31, 2012.
New Postcom, "Idle mode cell reselection considerations," R2-114133, 3GPP TSG RAN WG2 Meeting #75, Aug. 22-26, 2011, Athens, Greece, pp. 1-3.
Research in Motion UK Ltd: "GERAN LTE Interworking Issues with Legacy Systems", 3GPP Draft; GP-090675, 3rd Generation Partnership Project (3GPP), Mobile Competence Centre; 650, Route Des Lucioles; F-06921 Sophia-Antipolis Cedex; France, vol. TSG GERAN, no. Shenzhen; May 11, 2009, May 6, 2009, XP050414843, [retrieved on May 6, 2009].

* cited by examiner

TRANSITIONING OF MOBILE DEVICES WITHIN A WIRELESS COMMUNICATION NETWORK BETWEEN MULTIPLE RADIO ACCESS TECHNOLOGIES

CROSS-REFERENCE TO RELATED APPLICATIONS

This application claims the benefit of U.S. Provisional Patent Application No. 61/490,026, entitled, "TRANSITIONING OF MOBILE DEVICES WITHIN A WIRELESS COMMUNICATION NETWORK BETWEEN LEGACY AND ADVANCED RADIO ACCESS TECHNOLOGIES", filed on May 25, 2011, which is expressly incorporated by reference herein in its entirety.

BACKGROUND

1. Field

Aspects of the present disclosure relate generally to wireless communication systems, and more particularly, to transitioning of mobile devices within a wireless communication network between multiple radio access technologies (RATs).

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station. UEs may travel within the wireless communication network and may change the base stations with which they communicate. Such changes may occur while the UE is in idle mode operation or active mode operation and may involve utilizing different radio access technologies (RATs) which have correspondingly different features. As the demand for mobile broadband access continues to increase, the possibility that a mobile device will encounter different RATs increases. Thus, research and development continue to advance, not only to meet the growing demand for mobile broadband access, but to advance and enhance the user experience with mobile communications.

SUMMARY

The various aspects of the present disclosure are directed to transitioning an idle mode mobile device between multiple RATs. When a UE enters idle mode while camped to a first RAT network that does not indicate parameters to facilitate mobility to a higher priority RAT within the same public land mobile network (PLMN), such as one which employs a more advanced radio access technology than the first RAT network, an out of service search procedure is triggered that causes the UE to search a number of RATs within the same PLMN for another, higher-priority RAT. The UE can maintain a search timer in order to limit the amount of time that this search is conducted. If a higher-priority RAT is detected prior to the search timer expiring, then the UE re-selects to the higher-priority RAT and camps to that network. However, if a higher-priority RAT network is not detected, or the search timer expires before a higher-priority RAT network is detected, the UE immediately re-camps to the previous first RAT network.

In one aspect of the disclosure, a method for wireless communication includes entering an idle mode while coupled to a first RAT, determining that the first RAT does not broadcast cell reselection parameters which enable the UE to move to a higher priority RAT within a same PLMN as the first RAT, autonomously initiating an out of service search procedure of multiple RATs within the same PLMN as the first RAT while in the idle mode, determining a priority of one or more RATs detected by the search procedure in relation to the first RAT, and camping to a second RAT when the second RAT has a higher priority than the first RAT.

In an additional aspect of the disclosure, a UE configured for wireless communication includes means for entering an idle mode while coupled to a first RAT, means for determining that the first RAT does not broadcast cell reselection parameters which enable the UE to move to a higher priority RAT within a same PLMN, means for autonomously initiating an out of service search procedure of multiple RATs within the same PLMN as the first RAT while in the idle mode, means for determining a priority of one or more RATs detected by the search procedure in relation to the first RAT, and means for camping to a second RAT when the second RAT has a higher priority than the first RAT.

In an additional aspect of the disclosure, a computer program product has a computer-readable medium having program code recorded thereon. This program code includes code to enter an idle mode while coupled to a first RAT, code to determine that the first RAT does not broadcast cell reselection parameters which enable the UE to move to a higher priority RAT in a same PLMN as the first RAT, code to autonomously initiate an out of service search procedure of multiple RATs within the same PLMN as the first RAT while in the idle mode, code to determine a priority of one or more RATs detected by the search procedure in relation to the first RAT, and code to camp to a second RAT when the second RAT has a higher priority than the first RAT.

In an additional aspect of the disclosure, an apparatus includes at least one processor and a memory coupled to the processor. The processor is configured to cause the apparatus to enter an idle mode while coupled to a first RAT, to determine that the first RAT does not broadcast cell reselection parameters which enable the UE to move to a higher priority RAT in a same PLMN as the first RAT, to autonomously initiate an out of service search procedure of multiple RATs within the same PLMN as the first RAT while in the idle mode, to determine a priority of one or more RATs detected by the search procedure in relation to the first RAT, and to cause the apparatus to camp to a second RAT when the second RAT has a higher priority than the first RAT.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
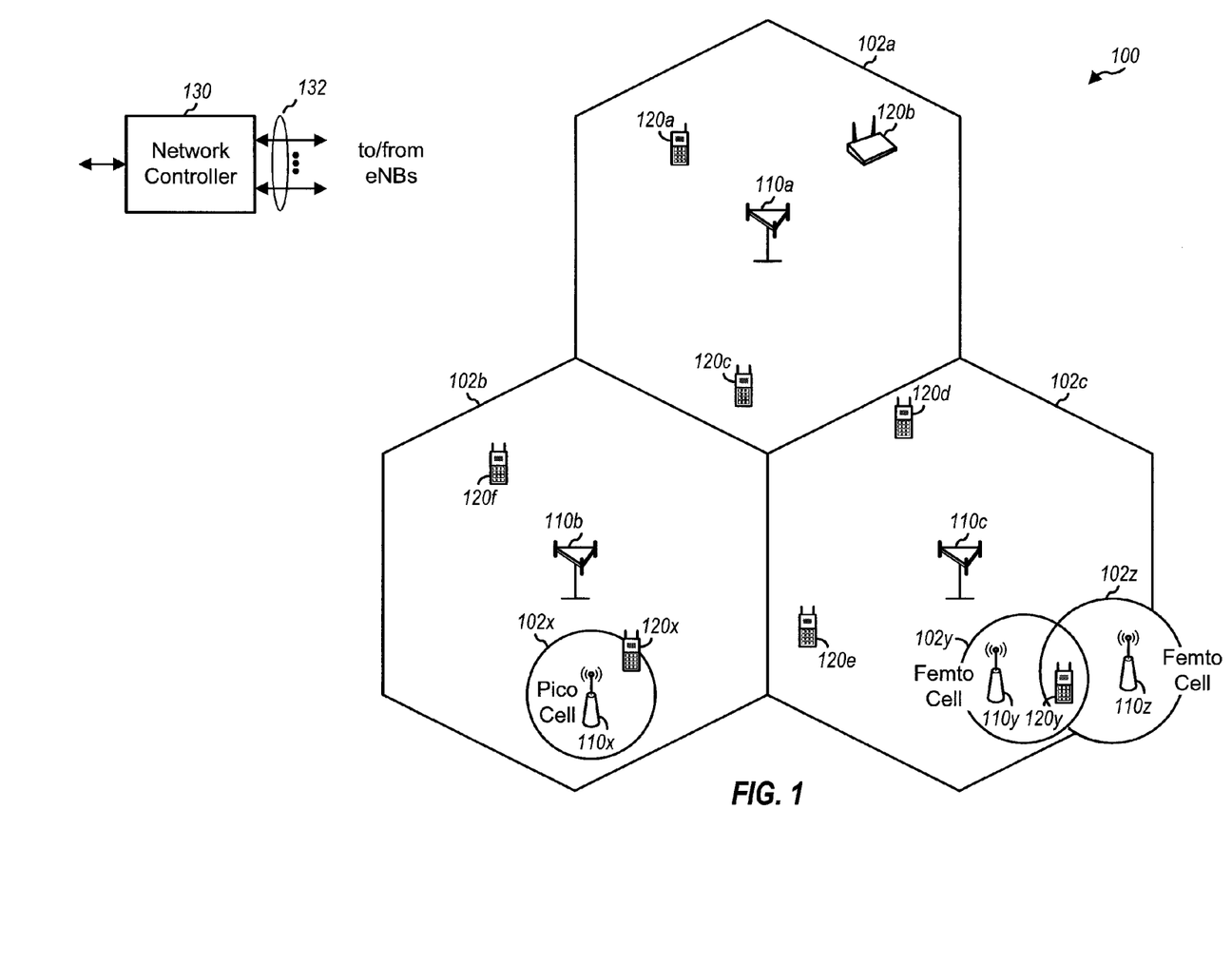
FIG. 1 is a block diagram illustrating an example of a mobile communication system.

FIG. 1 shows a wireless network 100 for communication. The wireless network 100 includes a number of evolved node Bs (eNBs) 110 (eNBs 110a-110c and 110x-110z) and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

As network providers update network technologies across their systems, such as wireless network 100, there may be multiple radio access technologies (RATs) provided across the entire network. For example, cell 102a provides access to wireless network 100 using a legacy RAT, such as various 2G or 3G technologies, while cells 102b and 102c have been upgraded to provide access to wireless network 100 using an advanced RAT, such as LTE or another E-UTRA technology, in addition to the legacy RAT. With this potential for multi-RAT communication networks, UEs may be designed with multi-RAT capabilities. Multi-RAT UEs, such as UE 120c, 120f, 120x, and 120y, may therefore access wireless network 100 using the legacy RAT of cell 102 or the advanced RAT of cells 102b and 102c. The UEs that are not compatible with the advanced RAT, such as UEs 120a, 120b, 120d, and 120e, may still access wireless network 100 using the legacy RAT in any of cells 102a, 102b, or 102c.

In cells that provide advanced RAT technologies, such as LTE, an eNB may provide communication coverage for a macro cell, a pico cell, a femto cell, and/or other types of cell. A macro cell (e.g., cells 102a-102c) generally covers a relatively large geographic area (e.g., several kilometers in radius) and may allow unrestricted access by UEs with service subscriptions with the network provider. A pico cell (e.g., 102x) would generally cover a relatively smaller geographic area and may allow unrestricted access by UEs with service subscriptions with the network provider. A femto cell (e.g., 102y-102z) would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110a uses the legacy RAT, while eNBs 110b and 110c, use both the legacy RAT and advanced RAT technologies. The eNB 110x is a pico eNB for a pico cell 102x. And, the eNBs 110y and 110z are femto eNBs for the femto cells 102y and 102z, respectively. These sub-macro eNBs, eNBs 110x-z, may also use advanced RAT technologies. While each of the eNBs 110 are shown for a particular cell, an eNB may support one or multiple (e.g., two, three, four, and the like) cells.

Among the various RATs, eNBs may be ranked for a UE based on a priority that exists to identify the eNBs that a particular UE may prefer connections with. For example, eNB 110y may be the home eNB (HeNB) for UE 120y. As the HeNB, eNB 110y may have a special billing relationship with the service provider of UE 120y, such that the cost to UE 120y to establish communication through eNB 110y is lower than to establish communication through the macro eNB 110c. Accordingly, eNB 110y may have a higher priority to UE 120y than eNB 110c. Similarly, eNB 110b may use an advanced RAT with much higher operating costs to the service provider than the advanced RAT used by eNB 110c. Thus, eNB 110c may have a higher priority to the service provider than eNB 110b. When in an idle state, it may be beneficial for UEs, such as UE 120y to attempt to re-select or camp to an eNB with a RAT that has a higher priority than its current eNB RAT.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless or wireline backhaul (not shown).

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like.

Figure 2:
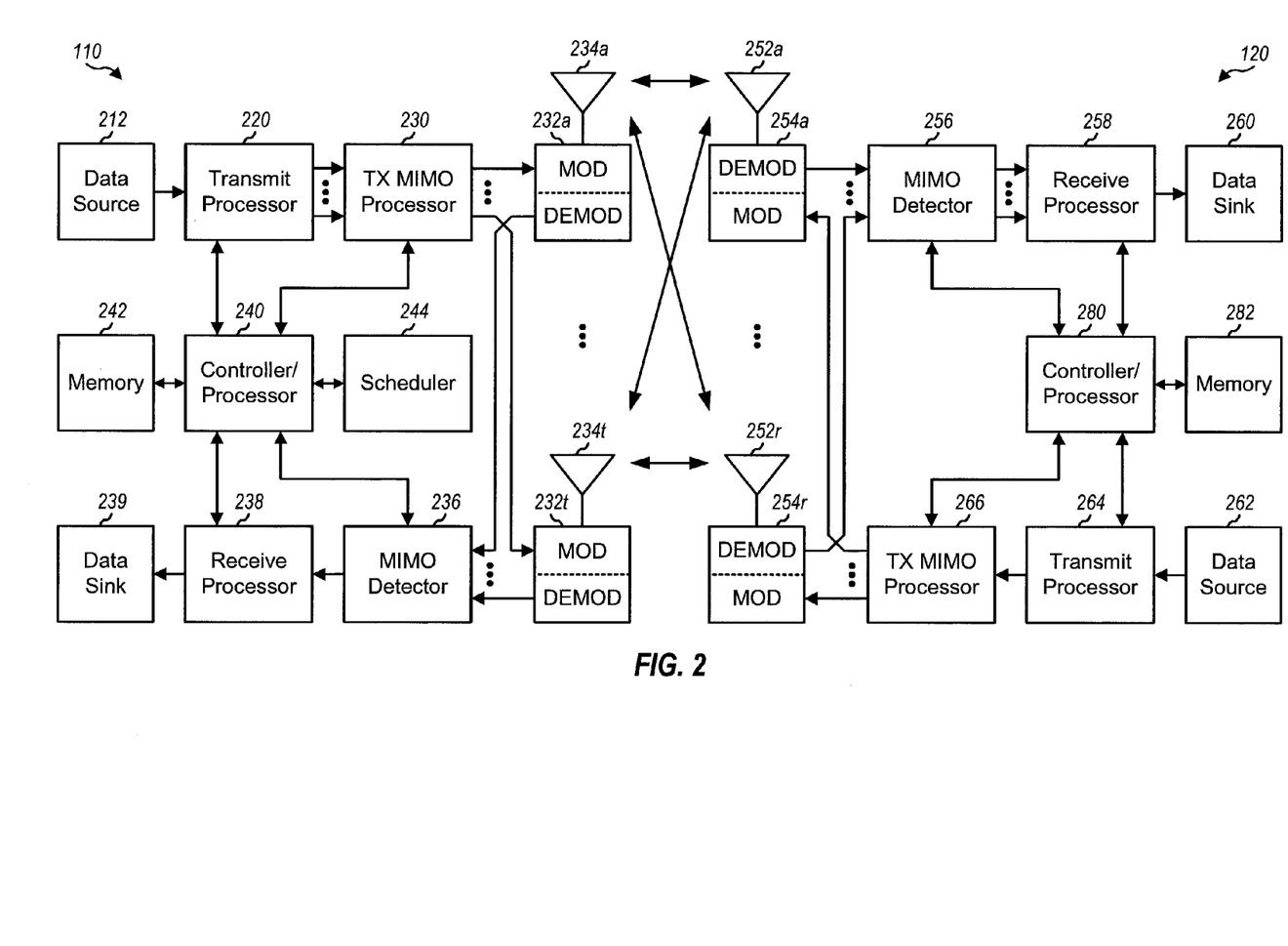
FIG. 2 is a block diagram illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The transmit processor 220 may process (e.g., encode and symbol map) the data and control information to obtain data symbols and control symbols, respectively. The transmit processor 220 may also generate reference symbols and cell-specific reference signals. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data from a data source 262 and control information from the controller/processor 280. The transmit processor 264 may also generate reference symbols for a reference signal. The symbols from the transmit processor 264 may be precoded by a TX MIMO processor 266 if applicable, further processed by the demodulators 254a through 254r, and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 4 and 5, and/or other processes for the techniques described herein. The memories 242 and 282 may store data and program codes for the eNB 110 and the UE 120, respectively. A scheduler 244 may schedule UEs for data transmission on the downlink and/or uplink.

In general operation, when a particular UE is coupled to a less preferred RAT, the UE may be pre-provisioned to change to a more preferred RAT if the less preferred RAT is within a different public land mobile network (PLMN). A RAT may be less preferred for a number of reasons, such as if it is owned by a different provider, or it has higher connection costs, or maybe is a less advanced RAT, or is a more advanced RAT with higher demand for connection. If multiple RATs fall within the same PLMN, the network can directly indicate the RAT preference order via system information broadcast messages, and the UE can use this information to trigger mobility to the most preferred RAT within the PLMN. However in some circumstances the network may not be upgraded to provide this information, in which case a UE may become stuck on a less-preferred RAT because that RAT does not provide a mechanism for the UE to move to a different RAT with the same PLMN.

For example, a UE may enter a cell served only by a less advanced legacy RAT, such as a 2G/3G system. Such a legacy RAT may not provide cell reselection information that would enable the UE to move back to the more advanced RAT in the same PLMN when such an advanced RAT again becomes available. For example, a more preferred LTE system might be available with the same PLMN as the 2G/3G system. Thus, if the UE enters an idle mode while in the legacy RAT and then enters an area serviced by the advanced RAT while it is still in the idle mode, it may be stuck on the less advanced RAT unless or until it goes through an entirely new random access attempt. As RATs are detected within the same PLMN, the UE can establish a priority of the detected RATs and re-camp to a second, higher-priority RAT. As noted above, the second RAT may be an advanced network which is preferred over the a legacy first-RAT, or some other higher priority RAT within the same PLMN As described herein a UE autonomously performs a search of RATs within the same PLMN when the UE enters an idle mode while camped to a first RAT, when the RAT does not provide any explicit RAT priority indication. Camping is a state in which the UE is connected to a cell and reading the cell's broadcast information. Camping includes basically acquiring the target cell, reading its cell ID and the broadcast system information. The UE camps on the cell and, thus, it decodes the downlink paging and other common channels. It is generally only a receiving state. Thus, according to the present disclosure, when the UE enters an idle mode while camped to the first RAT, it autonomously performs an out of service search of its neighboring RATs within the same PLMN. The UE may have a predetermined priority of RATs for selection within a PLMN, such that when the UE detects a higher priority RAT during the search, it may camp to that higher priority RAT without any explicit indication about the RAT priorities from the network.

In additional aspects, a search timer may be used to ensure that the UE does not search for the higher priority RATs for too long. If the UE fails to respond to pages from its current RAT for too long while performing an autonomously initiated search, the current RAT will think the UE is no longer connected and delete its registration information, which would cause an unnecessary loss of communications to and from the UE. The search timer would prevent the UE from performing its out of service search longer than a paging interval (or some other value) associated with the current RAT.

Figure 3:
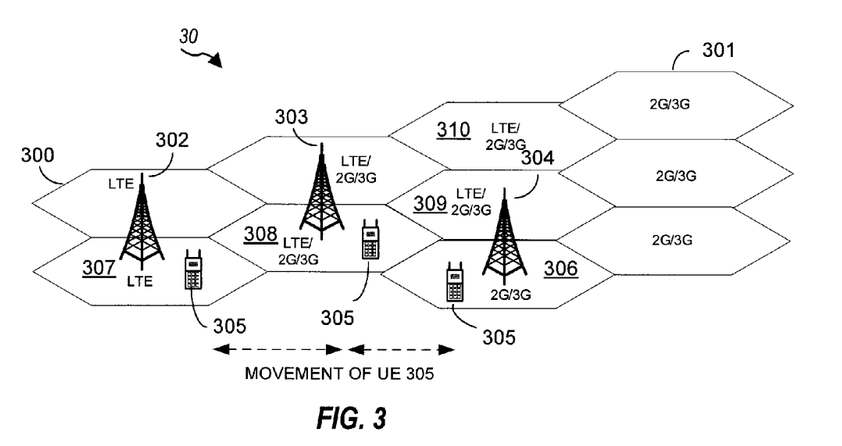
FIG. 3 is a block diagram illustrating a wireless communication system, in which a UE, that is configured according to one aspect of the present disclosure, is located.

FIG. 3 is a block diagram illustrating wireless communication system 30, in which a UE 305, that is configured according to one aspect of the present disclosure, is located. The wireless communication system 30 has new portions of the network that offer only advanced RAT technologies, such as LTE technology, upgraded portions of the network which include both advanced RATs and legacy RATs, and portions of the network that only offer legacy RATs, such as portions which are covered only by 2G and 3G technologies. The illustrated portion of wireless communication system 30 includes advanced RAT network 300 and legacy RAT network 301. Advanced RAT network 300 overlays legacy RAT network 301 at cells 308-310, thereby offering multiple RAT coverage in those cells.

As illustrated, UE 305 begins located in cell 307 served by eNB 302, which provides only LTE technology. UE 305 is a multi-RAT mobile device that is able to communicate using LTE in addition to legacy RATs. While in cell 307, UE 305 operates using the advanced RAT and then camps to the advanced RAT network 300 while in idle mode. While still in idle mode, UE 305 moves into cell 308 served by eNB 303 which provides both advanced and legacy RATs. However, for UE 305, the priority of the advanced RAT network 300 may be higher than the priority of the legacy RATs. Thus, UE 305 will remain camped to the advanced RAT network 300. When UE 305 moves into cell 306 served by eNB 304, which only offers legacy RAT network 301, UE 305 re-selects networks in order to camp to legacy RAT network 301. The public land mobile network (PLMN) associated with wireless communication system 30 includes both the advanced RAT network 300 and legacy RAT network 301. Thus, UE 305 uses the PLMN associated with wireless communication system 30 to select the next available network, e.g., the legacy RAT network 301, when it moves into cell 306.

In the present example, legacy RAT 301 does not provide cell reselection information with which UE 305 can feature that allows UEs to re-select to advanced RATs, such the LTE network of advanced RAT 300 within the PLMN associated with wireless communication system 30. Thus, the information that UE 305 would use to reselect advanced RAT network 300 (e.g., priority of neighboring RATS, frequencies to search, threshold for triggering re-selection, etc.) may not be broadcast by eNB 303. Without this network information, when UE 305 moves back to cell 308 from cell 306 during idle mode, it may remain camped on legacy RAT network 301 even though its higher-priority RAT, advanced RAT network 300, is again available. This is because, as previously noted, both the advanced RAT network 300 and the legacy RAT network 301 are within the same PLMN. If advanced RAT network 300 were in a different PLMN than legacy RAT network 301, then UE 305 would use the standard PLMN selection logic to select the higher priority RAT network. However, in wireless communication system 30, the PLMN is shared, therefore, UE 305 will remain camped in legacy RAT network 301 unless UE 305 loses service coverage from eNB 308 or its power is cycled off and on.

Figure 4:
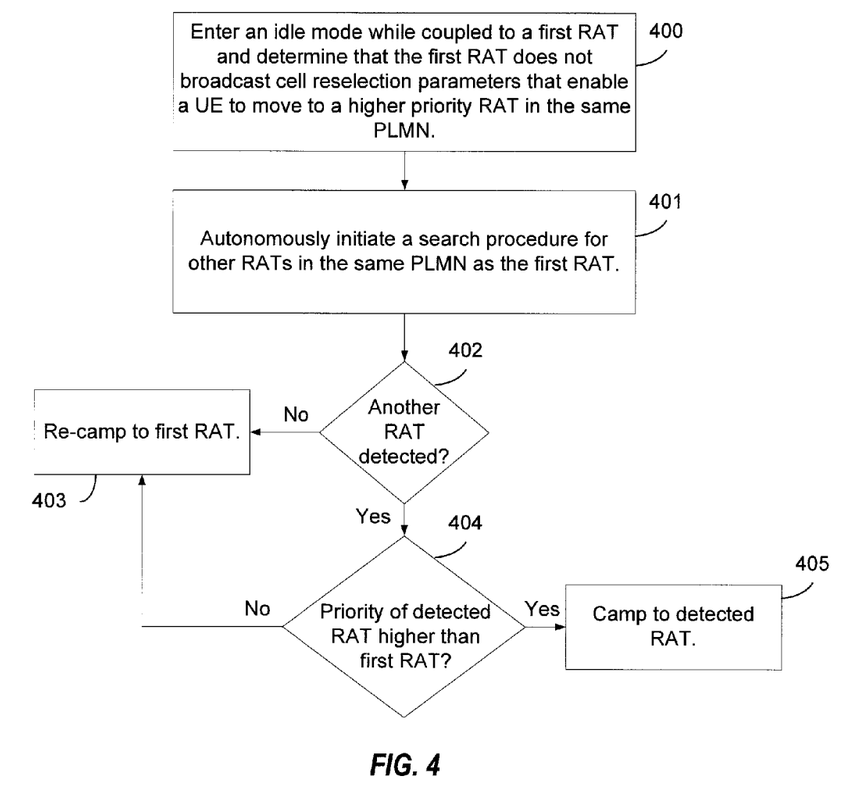
FIG. 4 is a functional block diagram illustrating example blocks executed to implement one aspect of the present disclosure.

According to the present disclosure, to address this issue, UE 305 includes a feature that autonomously initiates a network scan, such as an out of service search procedure to re-select a higher-priority RAT cell. Because initiating such a scan while UE 305 is in an active mode could interrupt or prevent UE 305 from receiving data over wireless communication system 30, the UE 305 initiates the network scan while UE 305 is in an idle mode. FIG. 4 is a functional block diagram illustrating example blocks executed to implement one aspect of the present disclosure. In block 400, a UE, such as UE 305, enters an idle mode while coupled to a first RAT, such as legacy RAT network 301, and determines the availability of cell reselection parameters that enable a UE to move to a higher priority RAT. If such cell reselection parameters are not available (e.g., this information is not included in a system information message broadcast by legacy RAT network 301) then, in block 401, the UE initiates an out of service search procedure in which it searches a number of RATs within the same PLMN as the first RAT while in the idle mode. The out of service search procedure can be performed independently of signaling received from the first RAT. For example, as previously discussed, the legacy RAT network 301 may not broadcast information about the advanced RAT network 300, which can be particularly problematic when both RATs belong to a same PLMN. A determination is made, in block 402, whether another RAT is detected among the various RATs. If no other RAT is detected, then, in block 403, the UE re-camps to the first RAT that it had just been camped to.

If another RAT is detected in the determination of block 402, then, in block 404, a determination is made whether the detected RAT has a higher priority than the first RAT. If not, then the UE re-camps to the first RAT as before, in block 403. Otherwise, if the detected RAT has a higher priority than the first RAT, such as the higher-priority advanced RAT 300 over the lower-priority legacy RAT 301, then, in block 405, the UE camps to the higher-priority detected RAT.

It should be noted that an out of service search procedure is a feature typically used when a UE loses service from its serving base station or cell. When service is lost, the UE will begin retuning its radios to scan for known or expected networks that it can connect to. According to the various aspects of the present disclosure, the out of service search procedure may be modified to provide the prioritization of the search for additional higher-priority networks, while having already camped to the first RAT. Additional modifications may be included to address the needs of the particular system or network.

Figure 5:
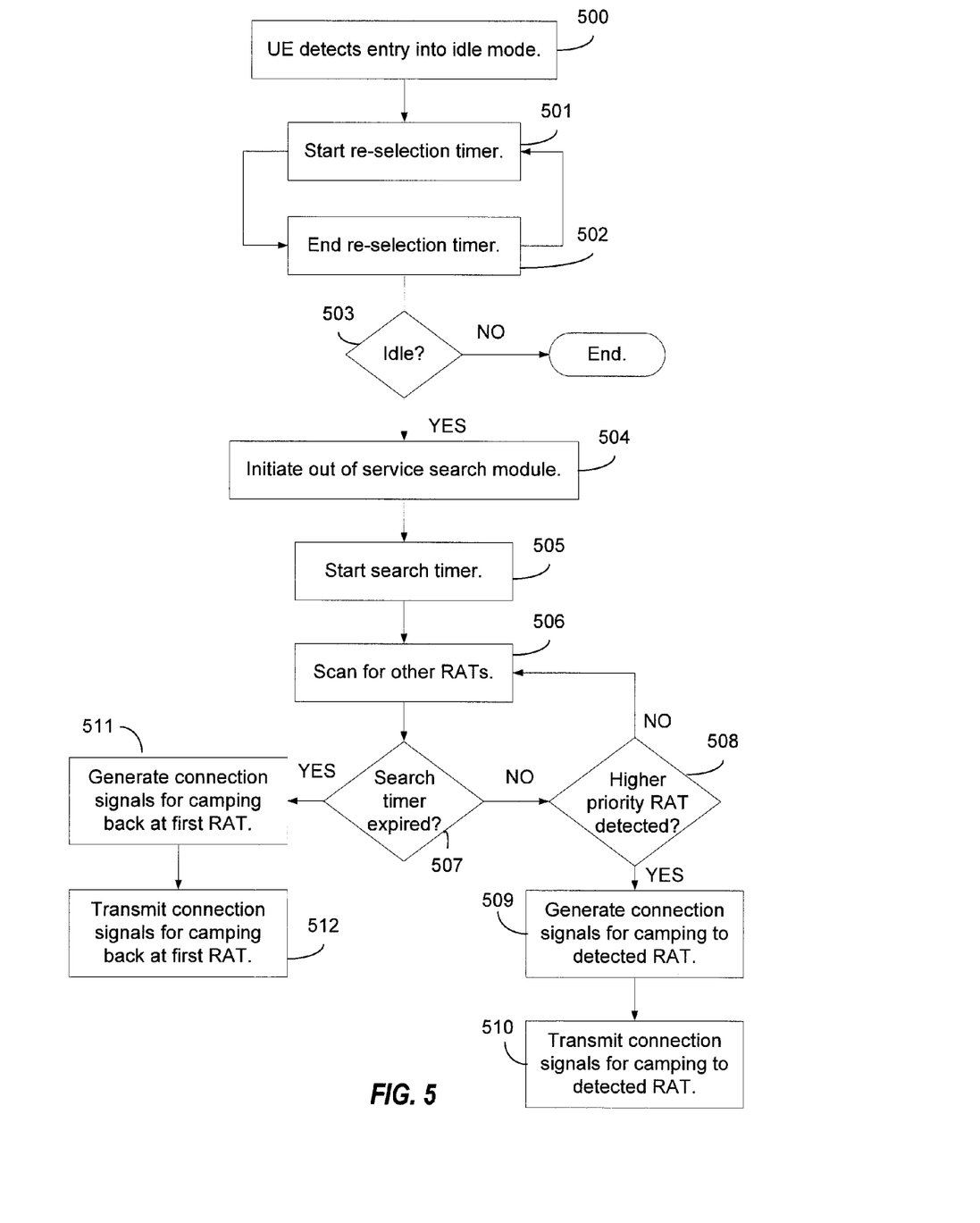
FIG. 5 is a functional block diagram illustrating example steps executed to implement one aspect of the present disclosure.

It should further be noted that the various aspects of the present disclosure, including the processes described with regard to FIGS. 4 and 5 can be executed or implemented in circumstances in which the serving RAT is not already broadcasting cell re-selection parameters that would enable the UE to move to the higher-priority RAT network. If the serving RAT does, in fact, broadcast cell re-selection parameters that would enable such a move to the higher-priority RAT, then normal re-selection procedures may be followed.

While scanning RATs to detect other RATs, the UE tunes its radio away from the first RAT that the UE is currently camped to. With its radios tuned away, the UE will not receive any pages or additional data transmitted to it over the first RAT. If the scan takes too long, the UE may also miss retransmissions of the pages. If the UE misses too many retransmitted pages, the first RAT will delete the UE's registration from its network. Should the UE then attempt to reconnect to the first RAT network, it would re-register first, which would cause a considerable delay in communications to and from the UE. In order to prevent a UE from missing a page or even being de-registered because of this scanning process, a time limit may be established for each scan. In one aspect, a search timer within the UE, for example, may begin when the UE starts the scan. If no other higher-priority RAT network is detected before the search timer runs out, the UE will immediately re-camp back to the first RAT network that it was just camped to when it entered idle mode and began scanning for other RATs. Re-camping back to the first RAT may involve registration procedures, such as routing area update (RAU) procedures, tracking area update (TAU) procedures, or the like. By returning to the first RAT network in a sufficient period of time, the UE should avoid missing page transmissions or re-transmissions and lessen the risk of being de-registered from the network.

When a UE remains stationary in a location covered only by the first RAT during a scan, the scan will not result in a detected higher-priority RAT network. If the UE starts moving thereafter, there is a chance that the UE will move into a region served by such a higher-priority RAT network. In order to accommodate the mobile aspect of UEs, the UE may initiate the scan for other higher-priority RATs on a periodic basis, while the UE is in an idle state. When the UE enters an idle state in the first RAT network, a scan for higher-priority RAT networks will be initiated periodically until a higher-priority RAT network is detected or the UE enters into an active mode. A re-selection timer, for example, may be included with the UE to control this periodic re-selection search or scan trigger. Each time the re-selection timer counts through its period and the UE remains in idle mode, the UE will be triggered to begin the modified out of service search procedure or similar scan for other RATs. For purposes of this disclosure the period may be a uniform period or a non-uniform period. For example, when the UE first enters the idle mode camped in the first RAT, the scan may be triggered after only a small period, while subsequent scans are triggered at a longer period, or even a dynamic length period based on the time that the UE has been in the idle mode. The various aspects of the present disclosure are not limited to only a uniform period.

With respect to the functional block diagram of FIG. 5, the first RAT may be any various type of RAT (e.g., legacy RAT, advanced RAT, home eNB RAT, etc.), while the higher-priority RATs are determined according to the prioritization assigned or determined for the particular UE or network. For example, if the UE has a home eNB RAT, then that RAT may be assigned a higher priority. Additionally, a UE may prioritize legacy RATs over more advanced RATs for power saving reasons or because of its limited functionality. As such, the UE begins on its current RAT and, during the idle mode searches for additional RATs, evaluates the priority of any other detected RATs against it currently-camped-to RAT.

Referring again to FIG. 2, in one configuration, the UE 120 may include means for entering an idle mode while coupled to a first RAT, means for autonomously initiating an out of service search procedure of a plurality of RATs within the same PLMN as the first RAT while in the idle mode, means for determining a priority of one or more RATs detected by the search procedure in relation to the first RAT, and means for camping to a second RAT when the second RAT has a higher priority than the first RAT. In one aspect, the aforementioned means may be the processor(s), the controller/processor 280, the memory 282, the receive processor 258, the MIMO detector 256, the demodulators 254a, and the antennas 252a configured to perform the functions recited by the aforementioned means. In another aspect, the aforementioned means may be a module or any apparatus configured to perform the functions recited by the aforementioned means.

An out of service search feature of any particular UE, such as UE 120, may be stored as a module in the memory 282 of the device. For UEs, such as UE 120, configured according to the various aspects of the present disclosure, the out of service search module may be modified to include a search prioritization in which UE 120 will compare and determine whether any detected RATs have a higher priority than the current RAT. Additional modules, such as a search timer and a re-selection timer, would also be stored on the memory 282.

FIG. 5 is a functional block diagram illustrating example steps executed to implement one aspect of the present disclosure. When UE 120 enters into an idle mode, the controller/processor 280 detects that entry, in block 500, and initiates the re-selection timer, in block 501, stored in memory 282. Upon expiration of the re-selection timer, in block 502, the controller/processor 280 verifies, in block 503, that UE 120 remains in an idle state. If UE 120 is still idle, then, in block 504, the controller/processor 280 is prompted by execution of the re-selection timer to initiate the modified out of service search module stored in memory 282 when camped on a legacy RAT. Through execution of this out of service search module, UE 120 scans for advanced RATs that it may camp to in block 506. When the controller processor initiates the modified out of service search module, it also executes the search timer, in block 505, stored in memory 282. In block 507, a determination is made whether the search timer has expired. If so, then, the controller/processor 280 triggers connection signals for re-camping to the previous legacy RAT to be generated, in block 511, at the transmit processor 264 and transmitted, in block 512, to the legacy RAT network using the TX MIMO processor 266, modulators 254r, and antennas 252r. If the search timer has not yet expired, then, a determination is made, in block 508, whether an advanced RAT network has been detected. If not, then the search continues from block 506. Otherwise, if an advanced RAT network is detected, then controller/processor 280 triggers connection signals to be generated, in block 509, at the transmit processor 264 and transmitted, in block 510, to the advanced RAT network using the TX MIMO processor 266, modulators 254r, and antennas 252r.

Figure 6:
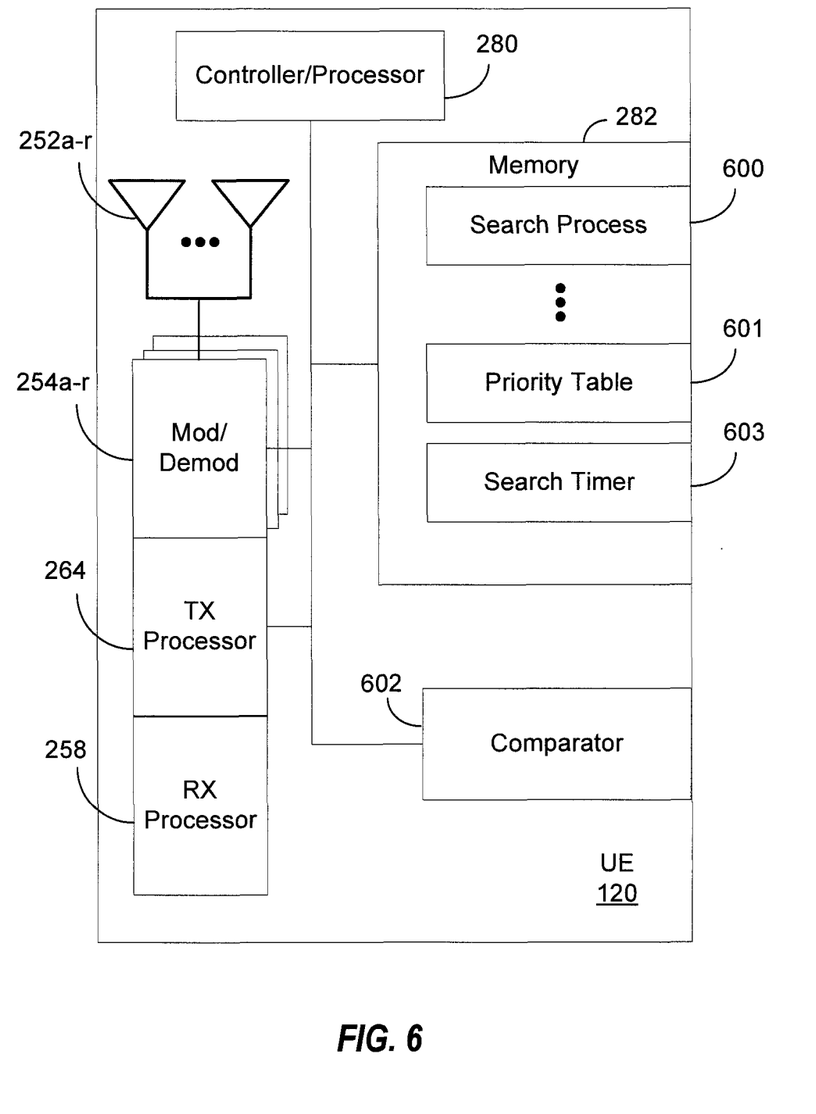
FIG. 6 is a block diagram illustrating a UE configured according to one aspect of the present disclosure.

FIG. 6 is a block diagram illustrating a UE 120 configured according to one aspect of the present disclosure. UE 120 includes controller/processor 280 that controls the various components and executes any software or firmware that is used to operate the functionality and features of UE 120. When a communication session with UE 120 ceases for a period of time, UE 120 may enter idle mode, in which regular communication activities cease. Controller/processor 280 manages the inactivity timers (not shown) and determines when to disengage the various communication components in UE 120, including, but not limited to, receive processor 258, transmit processor 264, modulator/demodulators 254a-4, and antennas 252a-r. The combination of these components and the acts performed by controller/processor 280 in disengaging these components provides means for entering an idle mode while coupled to a first RAT.

On placing UE 120 into idle mode, controller/processor 120 determines that it is within the same PLMN by checking memory 282 for its current settings. Having remained in the same PLMN, controller/processor 280 accesses memory 282 to initiate search process 600. Search process 600, which is configured according to one aspect of the present disclosure, begins searching for other RATs within the PLMN. The search process 600 may be an out of service search or similar thereto. The running search process 600, under control of controller/processor 280, operates antennas 252a-r, demodulators 254a-r, and receive processor 258 to receive and demodulate signals to identify other RATs in the PLMN. The combination of these components and acts provides means for autonomously initiating an out of service search procedure of multiple RATs within the same PLMN as the first RAT while in the idle mode.

When the executing search process 600 identifies other RATs within the same PLMN, it compares the priority of the detected RAT to the current RAT. Controller/processor 280 access the priority table 601 within memory 282 to identify the priority associated with the detected RAT and the current RAT. Using comparator 602, the priorities are compared to determine which RAT has the higher priority. The combination of these components and acts provides means for determining a priority of one or more RATs detected by the search procedure in relation to the first RAT.

After determining that the detected RAT has a higher priority than the current RAT, controller/processor 280 controls receive processor 258, demodulators 254a-r, and antennas 254a-r to tune to receive signals from the detected RAT. The signals include the cell ID of the detected RAT, the broadcast system information, and the like. This tuning of UE 120 to the detected RAT camps the UE 120 to the detected RAT, in which UE 120 will now receive signals from the detected RAT decoding its downlink paging and other common channels. The combination of these components and acts provides means for camping to a second RAT when the second RAT has a higher priority than the first RAT.

In selected aspects of the present disclosure, UE 120 may also include search timer 603 in memory 282. When executed by controller/processor 280, search timer 603 prevents search process 600 from executing too long. Controller/processor 280 triggers search timer 603 when it executes search process 600. If no other RATs are detected before search timer 603 expires, controller/processor 280 stops search process 600 and re-camps UE 120 to its original RAT. Operation of search timer 603 prevents UE 120 from being tuned away from the original RAT for too long, which could cause the original RAT to delete the registration of UE 120, thus, creating an unnecessary loss of communication and delay in re-establishing a connection with the original RAT. The combination of these components and acts provides means for starting a search timer in response to the initiating and means for performing re-camping when the search timer expires prior to detecting the second RAT during the search procedure.

The search timer may be used to ensure that the UE does not search for the higher priority RATs for too long. If the UE fails to respond to pages from its current RAT for too long while performing an autonomously initiated search, the current RAT will think the UE is no longer connected and delete its registration information, which would cause an unnecessary loss of communications to and from the UE. The search timer would prevent the UE from performing its out of service search longer than a paging interval (or some other value) associated with the current RAT.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   entering an idle mode while coupled to a first radio access technology (RAT);
   determining that the first RAT does not broadcast cell reselection parameters which enable the UE to move to a higher priority RAT within a same public land mobile network (PLMN);
   autonomously initiating an out of service search procedure of a plurality of RATs within the same PLMN as the first RAT while in the idle mode;
   determining a priority of one or more RATs detected by the search procedure in relation to the first RAT; and
   camping to a second RAT within the one or more detected RATs when the second RAT has a higher priority than the first RAT.

2. The method of claim 1, further comprising:
   re-camping to the first RAT when the second RAT is not detected.

3. The method of claim 2, further comprising:
   starting a search timer in response to the initiating; and
   performing the re-camping when the search timer expires prior to detecting the second RAT during the search procedure.

4. The method of claim 3, wherein the search timer is set based on a maximum paging time for the first RAT.

5. The method of claim 1, wherein the search procedure is initiated periodically after entering the idle mode.

6. A user equipment (UE) configured for wireless communication, comprising:
   means for entering an idle mode while coupled to a first radio access technology (RAT);
   means for determining that the first RAT does not broadcast cell reselection parameters which enable the UE to move to a higher priority RAT within a same public land mobile network (PLMN);
   means for autonomously initiating an out of service search procedure of a plurality of RATs within the same PLMN as the first RAT while in the idle mode;
   means for determining a priority of one or more RATs detected by the search procedure in relation to the first RAT; and
   means for camping to a second RAT within the one or more detected RATs when the second RAT has a higher priority than the first RAT.

7. The UE of claim 6, further comprising:
   means for re-camping to the first RAT when the second RAT is not detected.

8. The UE of claim 7, further comprising:
   means for starting a search timer in response to the means for autonomously initiating; and
   means for performing the means for re-camping when the search timer expires prior to execution of the means for detecting the second RAT during the search procedure.

9. The UE of claim 8, wherein the search timer is set based on a maximum paging time for the first RAT.

10. The UE of claim 6, wherein the search procedure is initiated periodically after entering the idle mode.

11. A computer program product for wireless communications in a wireless network, comprising:
    a non-transitory computer-readable medium having program code recorded thereon, the program code comprising:
    program code to enter an idle mode while coupled to a first radio access technology (RAT);
    program code to determine that the first RAT does not broadcast cell reselection parameters which enable the UE to move to a higher priority RAT within a same public land mobile network (PLMN);
    program code to autonomously initiate an out of service search procedure of a plurality of RATs within the same PLMN as the first RAT while in the idle mode;
    program code to determine a priority of one or more RATs detected by the search procedure in relation to the first RAT; and
    program code to camp to a second RAT within the one or more detected RATs when the second RAT has a higher priority than the first RAT.

12. The computer program product of claim 11, further comprising:
    program code to re-camp to the first RAT when the second RAT is not detected.

13. The computer program product of claim 12, further comprising:
    program code to start a search timer in response to execution of the program code to initiate; and
    program code to execute the program code to re-camp when the search timer expires prior to execution of the program code to detect the second RAT during the search procedure.

14. The computer program product of claim 13, wherein the search timer is set based on a maximum paging time for the first RAT.

15. The computer program product of claim 11, wherein the search procedure is initiated periodically after entering the idle mode.

16. A user equipment (UE) configured for wireless communication, the UE comprising
    at least one processor; and
    a memory coupled to the at least one processor, wherein the at least one processor is configured:
    to enter an idle mode while coupled to a first radio access technology (RAT);
    to determine that the first RAT does not broadcast cell reselection parameters which enable the UE to move to a higher priority RAT within a same public land mobile network (PLMN);

to autonomously initiate an out of service procedure of a plurality of RATs within the same PLMN as the first RAT while in the idle mode;

to determine a priority of one or more RATs detected by the search procedure in relation to the first RAT; and to camp to a second RAT within the one or more detected RATs when the second RAT has a higher priority than the first RAT.

17. The UE of claim 16, wherein the at least one processor is further configured:

to re-camp to the first RAT when the second RAT is not detected.

18. The UE of claim 17, wherein the at least one processor is further configured:

to start a search timer in response to execution of the program code to initiate; and to re-camp when the search timer expires prior to the detection of the second RAT during the search procedure.

19. The UE of claim 18, wherein the search timer is set based on a maximum paging time for the first RAT.

20. The UE of claim 16, wherein the search procedure is initiated periodically after entering the idle mode.

* * * * *